(12) United States Patent
Catsburg et al.

(10) Patent No.: US 9,209,977 B2
(45) Date of Patent: Dec. 8, 2015

(54) PROCESSING MESSAGES RECEIVED AT A VEHICLE

(75) Inventors: Thomas M. P. Catsburg, Rochester, MI (US); Ansaf I. Alrabady, Livonia, MI (US)

(73) Assignee: General Motors LLC, Detroit, MI (US)

(*) Notice: Subject to any disclaimer, the term of this patent is extended or adjusted under 35 U.S.C. 154(b) by 153 days.

(21) Appl. No.: 13/444,518

(22) Filed: Apr. 11, 2012

(65) Prior Publication Data

US 2013/0275761 A1    Oct. 17, 2013

(51) Int. Cl.
*H04L 9/32* (2006.01)
*H04L 29/08* (2006.01)
*H04L 29/06* (2006.01)
*H04W 12/10* (2009.01)
*H04L 12/58* (2006.01)

(52) U.S. Cl.
CPC ............ *H04L 9/3247* (2013.01); *H04L 63/126* (2013.01); *H04L 67/12* (2013.01); *H04W 12/10* (2013.01); *H04L 12/58* (2013.01); *H04L 2209/84* (2013.01)

(58) Field of Classification Search
CPC .................... H04L 9/3281; H04N 21/8358
USPC ....................... 713/168, 176; 726/2
See application file for complete search history.

(56) References Cited

U.S. PATENT DOCUMENTS

| | | | |
|---|---|---|---|
| 2002/0032853 A1* | 3/2002 | Preston et al. | 713/151 |
| 2005/0073388 A1* | 4/2005 | Lee et al. | 340/5.1 |
| 2006/0282882 A1* | 12/2006 | Bajko et al. | 726/4 |
| 2007/0180229 A1* | 8/2007 | Salowey et al. | 713/156 |
| 2010/0191964 A1* | 7/2010 | Haddad et al. | 713/168 |

* cited by examiner

*Primary Examiner* — Anthony Brown
(74) *Attorney, Agent, or Firm* — Anthony Luke Simon; Reising Ethington P.C.

(57) ABSTRACT

A system and method for processing messages received at a vehicle. The method carried by the system involves wirelessly receiving at a vehicle a first communication message having secure credentials and a message signature for a second communication message. Then, the vehicle authenticates the first communication message via its secure credentials. Later, the vehicle wirelessly receives the second communication message and validates this second message using the message signature from the first message. In response to the validation, the second message is processed at the vehicle.

15 Claims, 2 Drawing Sheets

PROCESSING MESSAGES RECEIVED AT A VEHICLE

TECHNICAL FIELD

The present invention relates to vehicle modules programming and, more particularly, to methods for processing messages received at a vehicle.

BACKGROUND

A vehicle module may receive a firmware or any software file in order to upgrade its current software revision, add a new feature, fix a current issue, etc. However, in some occasions the software file received may be unneeded and large in size, may contain malicious or damaging code or data, or just be useless. To avoid these situations, it would be desirable to have prevention measures in order to avoid receiving such files at the vehicle in order to avoid wasting airtime cost (especially for large files), unnecessarily using of a communication channel of the vehicle, and the receiving a potentially harmful file.

SUMMARY

According to an embodiment of the invention, there is provided a method for processing messages received at a vehicle, comprising the steps of: (a) wirelessly receiving at a vehicle a first communication message having secure credentials and a message signature for a second communication message; (b) authenticating the first communication message via its secure credentials; (c) wirelessly receiving at the vehicle the second communication message; (d) validating the second communication message using the message signature from the first communication message; and (e) processing the validated message at the vehicle.

According to another embodiment of the invention, there is provided a telematics unit for processing messages received at a vehicle, wherein the telematics unit includes a processor and computer readable memory that contains instructions that are executed by the processor to carry out the following steps: (a) wirelessly receiving at a vehicle a first communication message having secure credentials and a message signature for a second communication message; (b) authenticating the first communication message via its secure credentials; (c) wirelessly receiving at the vehicle the second communication message; (d) validating the second communication message using the message signature from the first communication message; and (e) processing the validated message at the vehicle.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system and method described below are directed to different embodiments of an approach for processing messages received at a vehicle. This can be helpful when there is a cost associated with receiving messages at the vehicle, there is a limited availability of a communication channel used to receive messages at the vehicle, and/or to avoid receiving potentially harmful messages at the vehicle. In general, the disclosed methods involves receiving at least a secure first message containing a message signature for a second message, receiving a second message if the first message is authentic, validating the second message using the first, and then processing the second message if it is validated.

Communications System—

Figure 1:
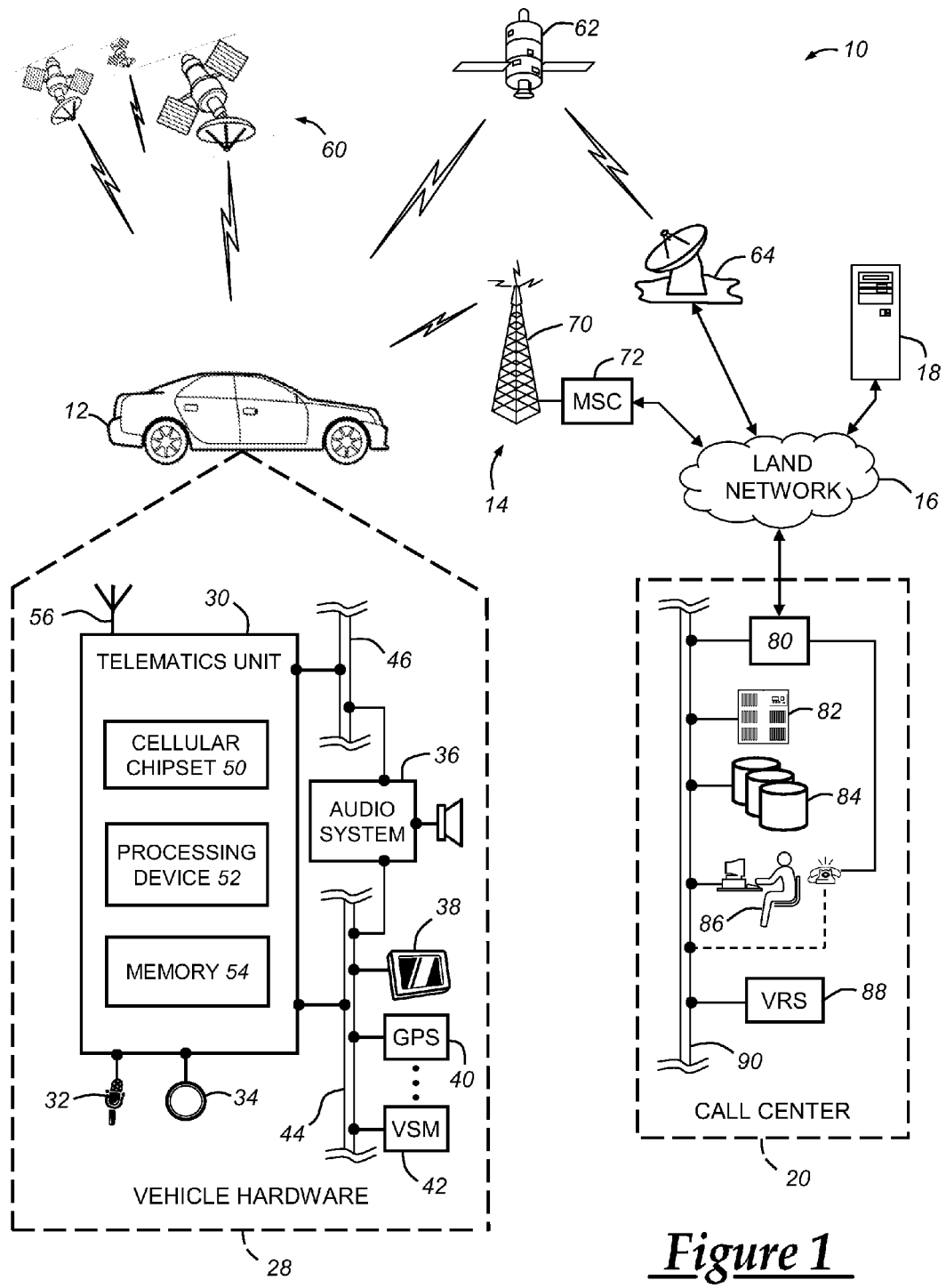
FIG. 1 is a block diagram depicting an exemplary embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

Figure 2:
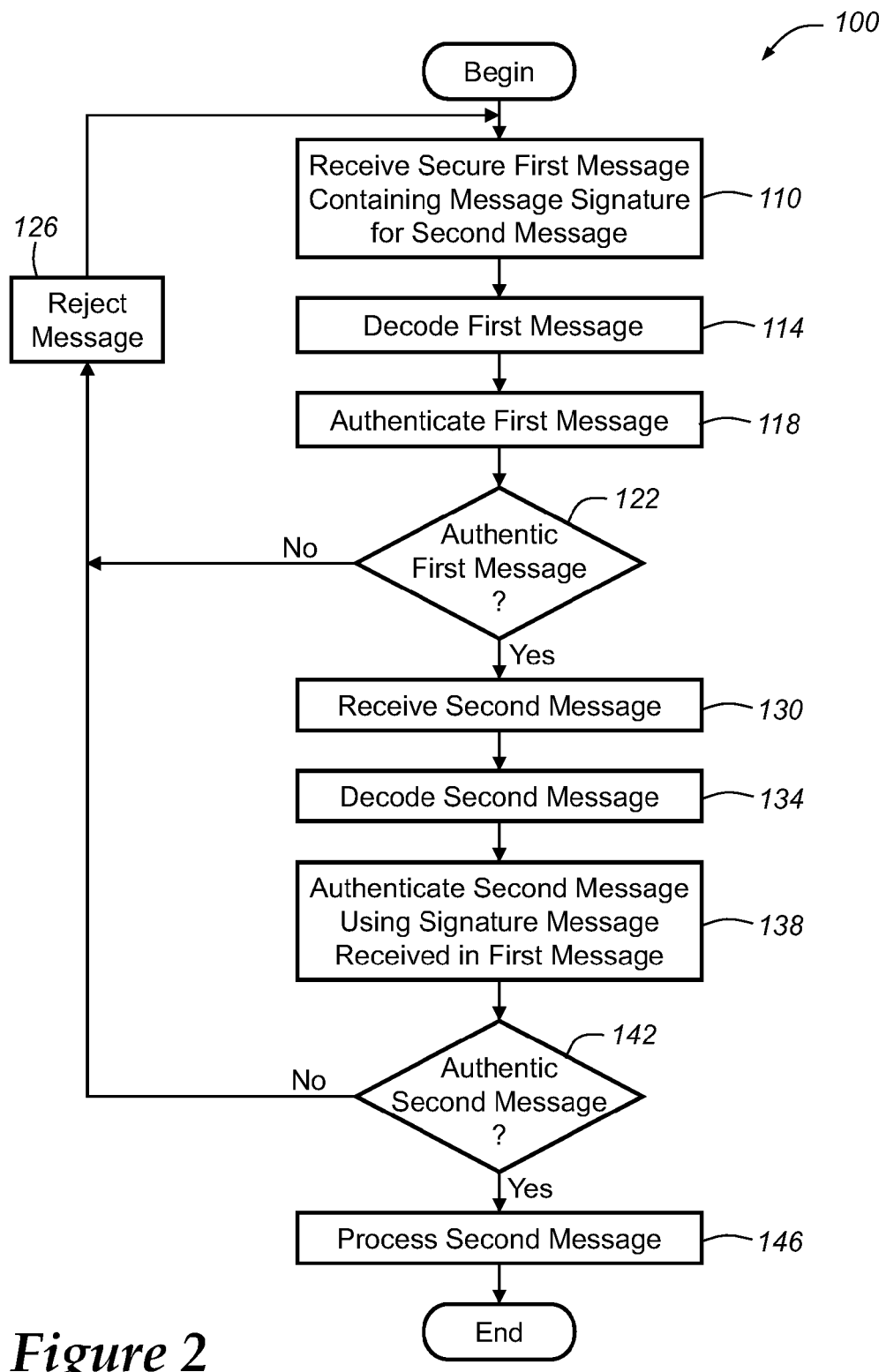
FIG. 2 is a flowchart depicting one embodiment of a method for processing messages received at a vehicle that may be used with the exemplary system shown in FIG. 1.

Turning now to FIG. 2, there is shown a method 100 for processing messages received at a vehicle. This method is merely illustrative of one embodiment and many other variations will become apparent to those skilled in the art. The method 100 starts at step 110 and begins by receiving a secure first message containing a message signature for a second message. In one embodiment, vehicle 12 receives at telematics unit 30 a secure first message containing a keyed-hashed message authentication code from call center 20. The secure first message may include a digital certificate issued by a certification authority. This secure first message may be a relatively small electronic size file in the order of few kilobytes (e.g., 1 kB, 2 kB, etc.). Skilled artisans should appreciate that receiving a small size file will generally provide savings in cost and time.

Next, at step 114, method 100 decodes the first message. The encoding and decoding of the first message can be performed using any cryptography technique known in the art including the use of asymmetric key algorithm, symmetric key algorithm, public key cryptography standards (PKCS 1-15, etc.), etc. In one embodiment, call center 20 encrypts the first message using a public key and then processing device 52 decrypts or decodes the first message using a private key stored at memory 54, for example. In another embodiment, a public key of vehicle 12 and a private key of call center 20 are used to encrypt the first message by call center 20 and later a private key of vehicle 12 and a public key of call center 20 are used to decrypt or decode the first message by vehicle 12. Skilled artisans will recognize that other embodiments are also possible.

Once the first message is decoded then at step 118 the first message is authenticated. The decoded message may include several credentials including a serial number of the digital certificate, subject unique identifier, signature algorithm, signature, issuer unique identifier, validity dates (e.g., not before, not after), key usage or purpose, public key, thumbprint algorithm (i.e., algorithm used to hash the public key), thumbprint (i.e., hash), extensions, and/or other credentials. In one embodiment, method 100 validates one or more credentials by comparing them to stored information at memory 54. For instance, processing device 52 compares signature subject, signature length, extension, etc. to previously stored information at memory 54. If the credentials of the first message match the information stored at the vehicle 12 then the first message is authentic; otherwise, the first message is not authentic.

Next, at step 122, method 100 provides a routing for the next steps of the method depending on the authenticity of the first message. If the first message, as determined by step 118, is authentic then method 100 proceeds to step 130; otherwise, method 100 proceeds to step 126 where it rejects the first message. In one embodiment, in case the first message is authentic then step 122 includes the step of sending an approval message to call center 20 to send a second message. In another embodiment, call center 20 waits a predetermined time after sending the first message (e.g., time usually needed to authenticate the first message, twice the time usually needed to authenticate the first message, etc.) then it sends a second message if call center 20 does not receive a rejection message from vehicle 12 sent via telematics unit 30 (step 126). Steps 122-126 provide an exit strategy to method 100 if the first message is not authentic. Therefore, the delivery of a larger size second message is avoided if the first message is not authentic and rejected. Skilled artisans should appreciate that, by avoiding communication of the second message if it is determined that the first message is not authentic, several benefits can be realized, including saving the cost associated with unnecessarily sending a larger size second message (e.g., airtime associated with sending a message to a vehicle), maintaining the availability of a communication channel that is used to send messages to a vehicle, and avoiding sending unverified files to a vehicle (e.g., avoiding potentially harmful file). Thus, if the first message is not authenticated, then, at step 126, method 100 rejects the first message and loops back to the beginning. In one embodiment, at step 126, vehicle 12 rejects the first message by sending a rejection message via telematics unit 30 to call center 20, in response to which call center 20 will not send a second message, or will abort the process of sending a second message if call center 20 has already started that process. Other embodiments are also possible.

Assuming the first message is authenticated, then at step 130, method 100 receives a second message. As described herein, the second message is a secure larger sized message. Typically, the second message will, at a minimum, be larger in size than the first message. In one embodiment, the second message generally contains an encrypted code and a payload that may be used to program a vehicle; for example, VSM software, calibration or mapping data, telematics unit commands, etc. In other embodiments, the payload may include different content such as music. In one embodiment, vehicle 12 receives at telematics unit 30 a secure second message containing a keyed-hashed message authentication code from call center 20. The secure second message may include a digital certificate issued by a certification authority.

At step 134, method 100 decodes the second message. This step is similar to step 114 where the first message was decoded. Therefore, a reiteration of the various techniques that may be used is omitted here. At the end of a decoding procedure, a decoded message may include a hash code and a data file (e.g., programming file, update file, etc.). Following step 134, method 100 proceeds to step 138 where method 100 attempts to validate (authenticate) the second message using the signature message received in the first message. If a hash code is used, then the hash code may be, for example: hashed message authentication code (HMAC), KHMAC, HMAC-MD, HMAC-SHA, etc. In one embodiment, processing device 52 compares a hash code decoded from the first message to the hash code decoded from the second message. If both hash codes are equal then processing device 52 authenticates (validates) the second message.

Next, at step 142, method 100 checks to determine if the second message is authentic. If the second message, as determined by step 138, is authentic then method 100 proceeds to step 146; otherwise, method 100 proceeds to step 126 where it rejects the message. Steps 142-126 provide an exit strategy to method 100 if the second message is not authentic. Skilled artisans should appreciate that rejecting the invalid second message provides some of the same benefits noted above, including avoiding using unverified files in a vehicle (e.g., avoiding potentially harmful file) or receiving and attempting to process unneeded or useless files.

If the second message is valid then method 100 continues to step 146 where it processes the second message. In one embodiment, the second message includes one or more software updates to one or more vehicle system modules (VSMs) 42. Therefore, vehicle 12 will update one or more VSMs 42 accordingly. In another embodiment, the second message may include a request to send data from one or more VSMs 42 to call center 20 or any other inquiry to one or more VSMs 42 from call center 20. Other embodiments are also possible.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method for processing messages received at a vehicle, comprising the steps of:
   (a) wirelessly receiving at a vehicle a first communication message comprising less than 2 kilobytes (kB) having secure credentials and a message signature for a second communication message;
   (b) authenticating the first communication message via its secure credentials;
   (c) wirelessly receiving at the vehicle the second communication message having a file size that is larger than the first communication message;
   (d) validating the second communication message using the message signature from the first communication message; and
   (e) processing the validated message at the vehicle.

2. The method of claim 1, wherein the first communication message includes a digital certificate issued by a certification authority.

3. The method of claim 1, wherein the message signature comprises a keyed-hashed message authentication code.

4. The method of claim 1, wherein the secure credentials of the first communication message include one or more of the following: a signer information, signature field type, signature length, and field domain extension.

5. The method of claim 4, wherein step (b) further comprises decoding the first communication message and authenticating the first communication message by validating one or more of the following: the signer information, signature field type, signature length, and field domain extension.

6. The method of claim 1, wherein after step (b) and prior to step (c), the method further comprises the step of wirelessly transmitting to the vehicle the second communication message.

7. The method of claim 1, wherein following step (e), the method further comprises the steps of: (f) wirelessly receiving at the vehicle a third communication message having secure credentials and a message signature for a fourth communication message; (g) determining that the third message fails on authentication test; and (h) terminating the method without receiving the fourth message.

8. The method of claim 1, wherein step (d) further comprises verifying the authenticity of the second communication message using the message signature from the first communication message and comparing one or more decrypted codes from the signature message to one or more codes obtained from the second communication message.

9. The method of claim 8, wherein the codes comprise hash codes generated using a payload of the second message.

10. The method of claim 8, wherein step (d) further comprises validating the second communication message by determining that the codes are equal.

11. The method of claim 1, wherein step (e) further comprises the step of programming a vehicle component using information from the second communication message.

12. A telematics unit for processing messages received at a vehicle, wherein the telematics unit includes a processor and computer readable memory that contains instructions that are executed by the processor to carry out the following steps:
   (a) wirelessly receiving at a vehicle a first communication message comprising less than 2 kilobytes (kB) having secure credentials and a message signature for a second communication message;
   (b) authenticating the first communication message via its secure credentials;
   (c) wirelessly receiving at the vehicle the second communication message having a file size that is larger than the first communication message;
   (d) validating the second communication message using the message signature from the first communication message; and
   (e) processing the validated message at the vehicle.

13. A vehicle telematics unit as defined in claim 12, wherein the telematics unit memory stores a decoding key that decodes the first communication message.

14. A vehicle telematics unit as defined in claim 12, wherein following step (e), the method further comprises the steps of: (f) wirelessly receiving at the vehicle a third communication message having secure credentials and a message signature for a fourth communication message; (g) determining that the third message fails on authentication test; and (h) terminating the method without receiving the fourth message.

15. A vehicle telematics unit as defined in claim 12, wherein step (d) further comprises verifying the authenticity of the second communication message using the message signature from the first communication message; comparing one or more decrypted codes from the message signature to one or more codes obtained from the second communication message; and validating the second communication message by determining that the codes are equal.

* * * * *